US012779424B2

(12) United States Patent
Hong et al.

(10) Patent No.: US 12,779,424 B2
(45) Date of Patent: Nov. 3, 2026

(54) METHOD AND APPARATUS FOR CONTROLLING NOX AND METHOD FOR PREPARING NOX-CONTAINING WATER

(71) Applicant: KOREA INSTITUTE OF FUSION ENERGY, Daejeon (KR)

(72) Inventors: Yong Cheol Hong, Goyang-si (KR); Kang Il Kim, Jeonju-si (KR); Geon Woo Yang, Gunsan-si (KR); Hee Jae Lee, Gunsan-si (KR)

(73) Assignee: KOREA INSTITUTE OF FUSION ENERGY, Daejeon (KR)

( * ) Notice: Subject to any disclaimer, the term of this patent is extended or adjusted under 35 U.S.C. 154(b) by 872 days.

(21) Appl. No.: 18/014,811

(22) PCT Filed: Jul. 20, 2021

(86) PCT No.: PCT/KR2021/009302
§ 371 (c)(1),
(2) Date: Jan. 6, 2023

(87) PCT Pub. No.: WO2022/030812
PCT Pub. Date: Feb. 10, 2022

(65) Prior Publication Data
US 2024/0238750 A1 Jul. 18, 2024

(30) Foreign Application Priority Data
Aug. 3, 2020 (KR) ........................ 10-2020-0096845

(51) Int. Cl.
*B01J 19/08* (2006.01)
*B01J 19/00* (2006.01)
(Continued)

(52) U.S. Cl.
CPC ......... *B01J 19/088* (2013.01); *B01J 19/0006* (2013.01); *C01B 21/203* (2013.01);
(Continued)

(58) Field of Classification Search
CPC .................. B01J 19/088; B01J 19/0006; B01J 2219/0801; B01J 2219/0809; B01J 7/00;
(Continued)

(56) References Cited

U.S. PATENT DOCUMENTS 5,396,882 A 3/1995 Zapol
5,485,827 A 1/1996 Zapol et al.
(Continued)

FOREIGN PATENT DOCUMENTS

CN 101239269 8/2008
CN 108990248 12/2018
(Continued)

OTHER PUBLICATIONS

SIPO, Search Report of CN 202180057663.5 dated Mar. 11, 2024.
KIPO, PCT Search Report & Written Opinion of PCT/KR2021/009302 dated Oct. 25, 2021.

*Primary Examiner* — Xiuyu Tai
(74) *Attorney, Agent, or Firm* — LEX IP MEISTER, PLLC

(57) ABSTRACT

A method for controlling nitrogen oxide (NOx) includes adjusting a flow rate of d gas injected into an arc-type plasma generating device, and identifying a concentration of the generated nitrogen oxide, while adjusting an amount of energy per unit flow rate of the injected gas.

2 Claims, 10 Drawing Sheets

(51) Int. Cl.
*C01B 21/20* (2006.01)
*H05H 1/48* (2006.01)

(52) U.S. Cl.
CPC ...... *H05H 1/482* (2021.05); *B01J 2219/0801* (2013.01); *B01J 2219/0809* (2013.01); *H05H 2245/10* (2021.05)

(58) Field of Classification Search
CPC ...... B01J 19/2405; B01J 19/14; B01J 19/126; B01J 19/087; B01J 12/002; B01J 2219/1227; B01J 2219/1242; B01J 2219/1218; B01J 2219/1281; B01J 2219/0898; B01J 2219/1266; B01J 2219/1296; B01J 2219/00164; H05H 1/482; H05H 2245/10; H05H 1/32; H05H 1/50; H05H 1/26; H05H 1/47; C01B 21/203; C01B 21/24; A61K 9/0014; A61K 33/00; A61K 9/007; A61M 35/30; A61M 2202/0275; A61M 16/10; A61M 16/024; A61M 16/105; A61M 16/12; A61M 2205/6018; A61M 16/0051; A61M 2205/6054; A61M 2016/0033; A61M 2205/125; A61M 2205/3368; A61M 2205/3317; A61M 2205/6072; A61M 16/085; A61M 2016/0027; A61N 1/44; Y02E 30/10; A61H 35/00; A61H 33/02; A61P 11/00
See application file for complete search history.

(56) References Cited

U.S. PATENT DOCUMENTS

| | | | | |
|---|---|---|---|---|
| 5,536,241 | A | 7/1996 | Zapol | |
| 5,570,683 | A | 11/1996 | Zapol | |
| 5,823,180 | A | 10/1998 | Zapol | |
| 5,873,359 | A | 2/1999 | Zapol et al. | |
| 2020/0360649 | A1* | 11/2020 | Hall | A61M 16/10 |
| 2022/0055901 | A1* | 2/2022 | Bell | B01J 7/00 |

FOREIGN PATENT DOCUMENTS

| | | |
|---|---|---|
| CN | 109351151 | 2/2019 |
| EP | 0994637 | 4/2000 |
| JP | 2004-167284 | 6/2004 |
| JP | 2006-273677 | 10/2006 |
| KR | 10-2005-0066233 | 6/2005 |
| KR | 20110139196 | 12/2011 |
| KR | 10-2012-0129579 | 11/2012 |
| KR | 10-1548603 | 8/2015 |
| KR | 10-1572384 | 11/2015 |
| KR | 10-2015-0139274 | 12/2015 |
| KR | 10-1636872 | 7/2016 |
| KR | 10-1689275 | 1/2017 |
| KR | 10-1962904 | 3/2019 |
| KR | 10-2227464 | 3/2021 |

* cited by examiner

METHOD AND APPARATUS FOR CONTROLLING NOX AND METHOD FOR PREPARING NOX-CONTAINING WATER

TECHNICAL FIELD

A method and apparatus for controlling nitrogen oxide (NOx) and a method for preparing NOx-containing water are provided.

BACKGROUND ART

Since R. F. Furchgott, L. J. Ignarro, and F. Murad won the Nobel Prize in 1998 for discovering that nitric oxide (NO), among nitrogen oxides, plays a role as a signaling molecule in living cells, interest in nitric oxide has spread rapidly in the academic world, and benefits of nitric oxide have been discovered in animals and plants.

In particular, since nitric oxide has the ability to activate cells, when nitric oxide-including water is periodically applied to a wound, the wound may be quickly regenerated to be cured. For example, when the wound is exposed to nitric oxide-including water, a wound surface is washed and microorganisms attached to or parasitic on the wound surface are sterilized. In addition, thread veins are expanded, blood circulation becomes good, cell proliferation becomes active, and protein proliferation becomes good. Therefore, macrophages increase a lot in the wound and fibroblasts proliferate quickly, enabling rapid wound healing.

In order to prepare water including nitrogen oxide, such as nitric oxide, research on technologies capable of appropriately producing and controlling nitrogen oxide has been conducted.

In the related art, research on producing nitrogen oxide using a microwave plasma generating device has been conducted. However, the microwave plasma generating device of the related art is an expensive system that has a complex matching structure requiring an auxiliary device, such as a tuner, and has poor mobility because the device is bulky. In addition, since the conventional microwave plasma generating device emits high-temperature flames, the capacity of a cooling device needs to be increased. The microwave plasma generating device has relatively low electrical energy efficiency due to energy lost in magnetron heat, and generates a relative little amount nitrogen oxide for input power.

DISCLOSURE

Technical Problem

An exemplary embodiment is to achieve excellent nitrogen oxide production efficiency by facilitating nitrogen oxide control.

An exemplary embodiment is to reduce cost, while achieving excellent mobility of nitrogen oxide control.

In addition to the above objects, exemplary embodiments according to the present invention may be used to achieve other objects not specifically mentioned.

Technical Solution

An exemplary embodiment of the present invention provides a method for controlling nitrogen oxide (NOx) including: adjusting a flow rate of d gas injected into an arc-type plasma generating device, and identifying a concentration of the generated nitrogen oxide, while adjusting an amount of energy per unit flow rate of the injected gas, wherein the arc-type plasma generating device includes an internal electrode and an external electrode facing the internal electrode, supplies oxygen, nitrogen, or a mixture gas thereof injected between the internal electrode and the external electrode, and applies voltage to the internal electrode and the external electrode to generate an arc-type plasma including nitrogen oxide.

The identifying of the concentration of nitrogen oxide may include identifying that the concentration of nitrogen oxide increases and then decreases as the amount of energy per unit flow rate of the gas increases.

The identifying of the concentration of nitrogen oxide may include identifying that the concentration of the generated nitrogen oxide is maximum, while the input voltage is minimized.

An exemplary embodiment of the present invention provides an arc-type plasma generating device including: an internal electrode and an external electrode facing the internal electrode, wherein the arc-type plasma generating device supplies oxygen, nitrogen, or a mixture gas injected between the internal electrode and the external electrode, applies voltage to the internal electrode and the external electrode to generate an arc-type plasma including nitrogen oxide, and controls the concentration of the nitrogen oxide by adjusting the flow rate of the injected gas.

The internal electrode may be rod-shaped, a portion of which may be hollow in the longitudinal direction and the other portion may not be hollow, the external electrode may surround the internal electrode and have an inclined structure, of which an outer circumference gradually increases and then decreases in the longitudinal direction.

The internal electrode may be rotated 360 degrees by a motor, and the external electrode may surround the internal electrode.

An exemplary embodiment of the present invention provides a method for preparing nitrogen oxide (NOx) including: injecting oxygen, nitrogen, or a mixture gas thereof into an arc-type plasma generating device; rotating the injected gas; generating arc-type plasma inside the arc-type plasma generating device, and generating an nitrogen oxide gas.

An exemplary embodiment of the present invention provides a method for preparing nitrogen oxide (NOx)-containing water including: injecting oxygen, nitrogen, or a mixture gas thereof into an arc-type plasma generating device; rotating the injected gas; generating arc-type plasma inside the arc-type plasma generating device; generating a nitrogen oxide gas; removing oxygen, which is a dissolved gas, and storing NOx-containing water.

The method may further include: removing oxygen, which is a dissolved gas, from the NOx-containing water.

The method may further include: cooling and storing the NOx-containing water.

Advantageous Effects

According to exemplary embodiments, by facilitating nitrogen oxide control, excellent nitrogen oxide production efficiency may be achieved, and cost may be reduced, while achieving excellent mobility of nitrogen oxide control.

MODE FOR INVENTION

Figure 1:
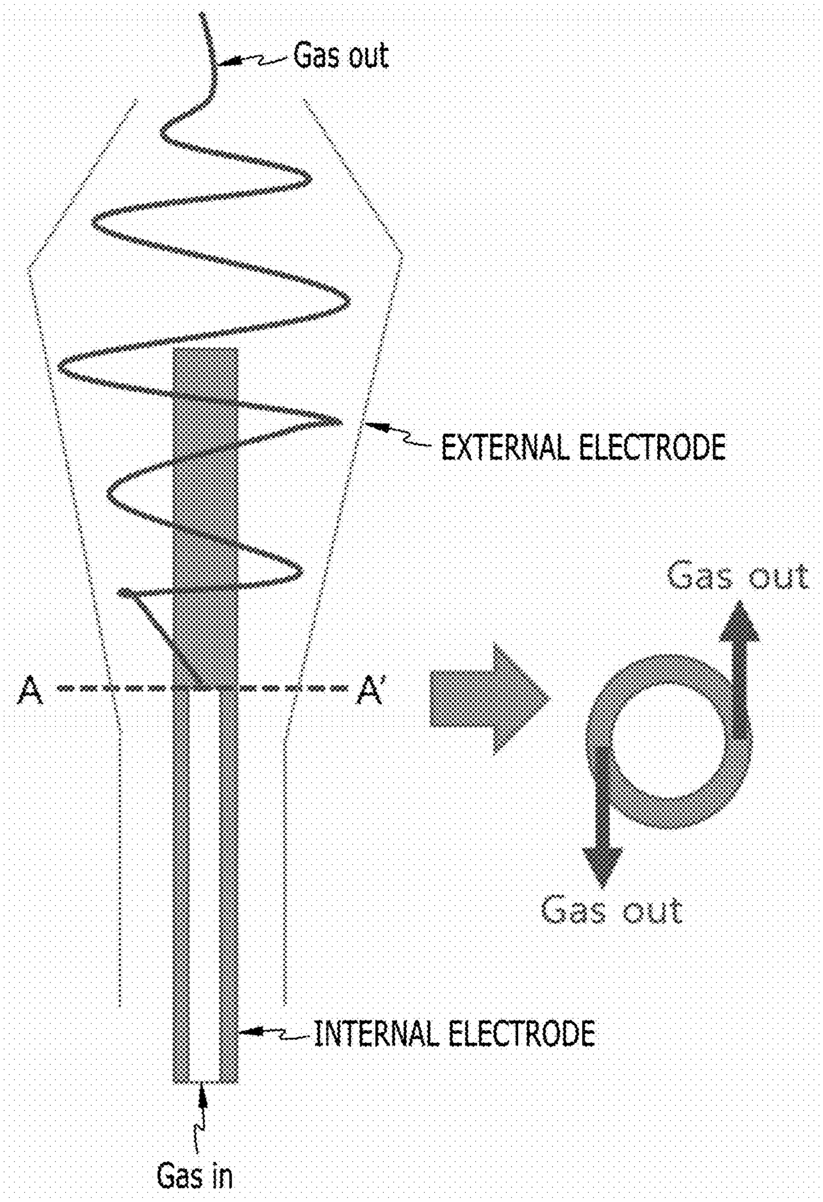
FIG. 1 is a view illustrating a gliding arc-type plasma generating device by way of example.

Exemplary embodiments of the present invention will now be described more fully hereinafter with reference to the accompanying drawings so that they may be easily implemented by one of ordinary skill in the art. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification. Also, detailed descriptions of a known art will be omitted.

Throughout the specification, unless explicitly described to the contrary, the word "comprise", and variations, such as "comprises" or "comprising", will be understood to imply the inclusion of stated elements but not the exclusion of any other elements.

Hereinafter, a method and apparatus for controlling nitrogen oxide according to an exemplary embodiment will be described in detail.

In order to control nitrogen oxide, a plasma generating device generates arc-type plasma, and since complicated matching devices, such as tuners, are not required and a separate cooling device is not required, generating of nitrogen oxide may be easily controlled. For example, the arc-type plasma may be a gliding arc-type plasma, a rotating arc-type plasma, or the like. The gliding arc-type plasma may be generated by injecting swirl gas. The rotating arc-type plasma may be generated by rotating an electrode or by injecting swirl gas without rotation of the electrode. In addition, the rotating arc-type plasma may be generated by rotating an electrode and simultaneously injecting swirl gas, and in this case, generating of nitrogen oxide may be more efficiently controlled. Since a device for generating gliding arc-type plasma does not require a driving device, such as a motor, the device is simpler and has better mobility than a device for generating rotating arc-type plasma that requires a driving device, such as a motor. However, since both the gliding arc-type and rotating arc-type plasma generating devices do not use an expensive, bulky microwave system that requires a complex matching structure, they are relatively inexpensive and have excellent mobility. In addition, in the case of the arc-type plasma, a rate of generating nitrogen oxide for input power is higher than that of microwave plasma.

An arc-type generating device according to an exemplary embodiment includes an internal electrode and an external electrode facing the internal electrode, and supplies oxygen, nitrogen, or a mixture gas thereof injected between the internal electrode and the external electrode, applies voltage to the internal electrode and the external electrode to generate arc-type plasma including nitrogen oxide, and adjusts a flow rate of the injected gas to control a concentration of the nitrogen oxide.

Figure 2:
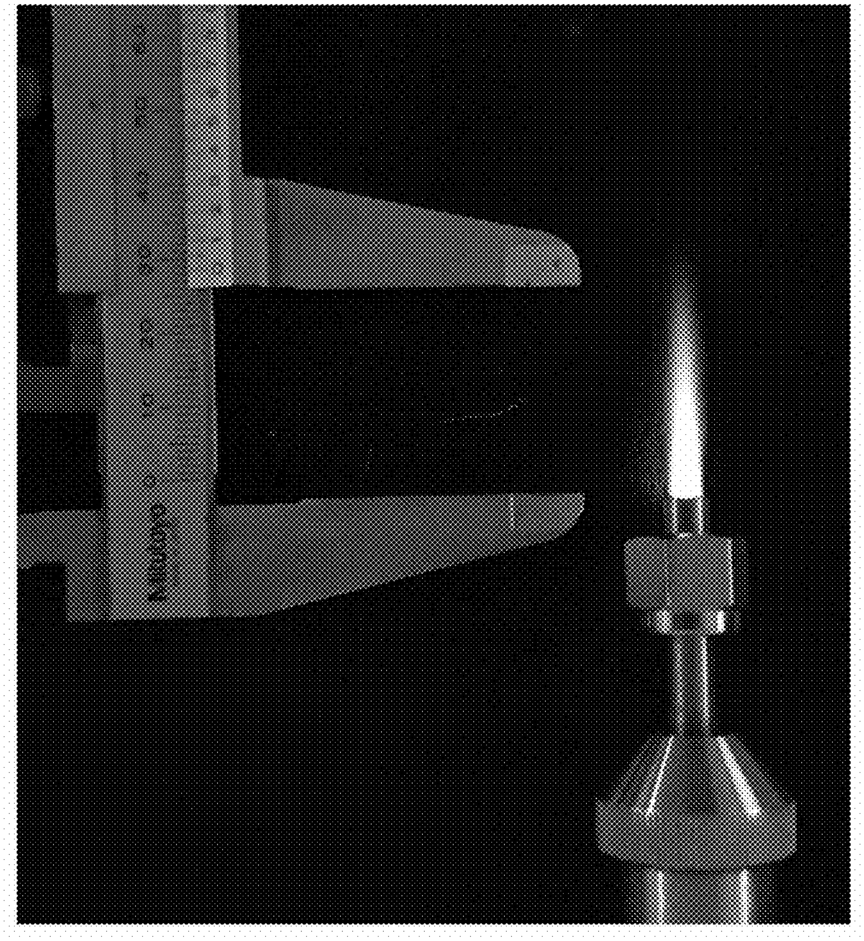
FIG. 2 is a photograph illustrating plasma generated in a gliding arc-type plasma generating device by way of example.

For example, in order to generate gliding arc-type plasma, internal and external electrodes having shapes as shown in FIG. 1 may be used. FIG. 1 is a view illustrating a gliding arc-type plasma generating device by way of example, and FIG. 2 is a photograph illustrating plasma generated in a gliding arc-type plasma generating device by way of example.

Referring to FIG. 1, the gliding arc-type plasma generating device includes an internal electrode having a rod shape, a portion of which is hollow in a longitudinal direction and the other portion of which is not hollow, and an external electrode surrounding the internal electrode and including an inclined surface, and power is supplied to the internal and external electrodes. Gas may be injected into the hollow portion at a lower end of the internal electrode. For example, the gas may be oxygen, nitrogen, or a mixture of oxygen and nitrogen. The gas injected into the lower end of the internal electrode passes through the hollow portion of the internal electrode, and the gas is spirally discharged to the outside through a swirl gas outlet from a middle portion of the internal electrode. Here, there are two swirl gas outlets, and the number of swirl gas outlets may be adjusted as needed. Referring to FIG. 2, it is shown that nitrogen oxide arc-type plasma having a length of about 26 mm is generated through the nozzle, and the external electrode is located inside the nozzle. The external electrode has a structure inclined in a candle shape. For example, the external electrode may have a structure in which an outer circumference thereof gradually increases in the longitudinal direction and then decreases. Since the external electrode of this structure has an open plasma outlet, it is easy to work and manufacture.

The gliding arc-type plasma may be generated by the plasma generating device having the internal electrode having a candle-shaped inclined structure and the external electrode surrounding the internal electrode in a cylindrical shape. However, in the plasma generating device having such a structure, since the internal electrode is formed to have a spherical shape and the spherical internal electrode needs to be worked, the structure of the internal electrode is complicated and manufacturing difficulty is high.

Figure 3:
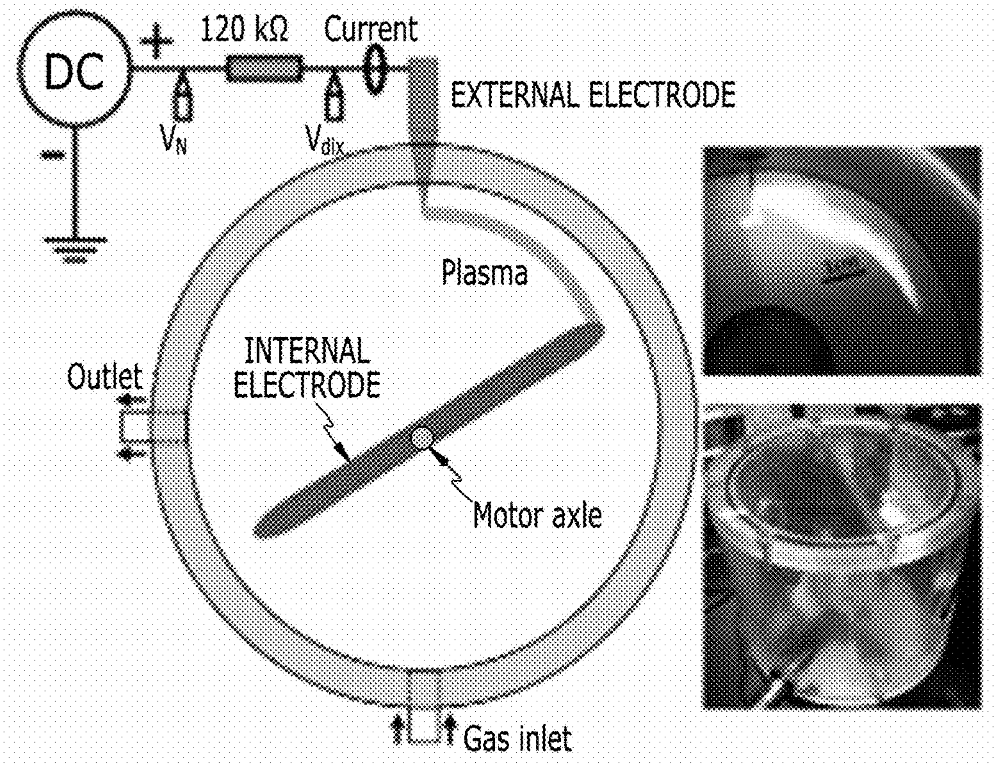
FIG. 3 is a diagram illustrating a rotating arc-type plasma generating device according to an exemplary embodiment.
Figure 4:
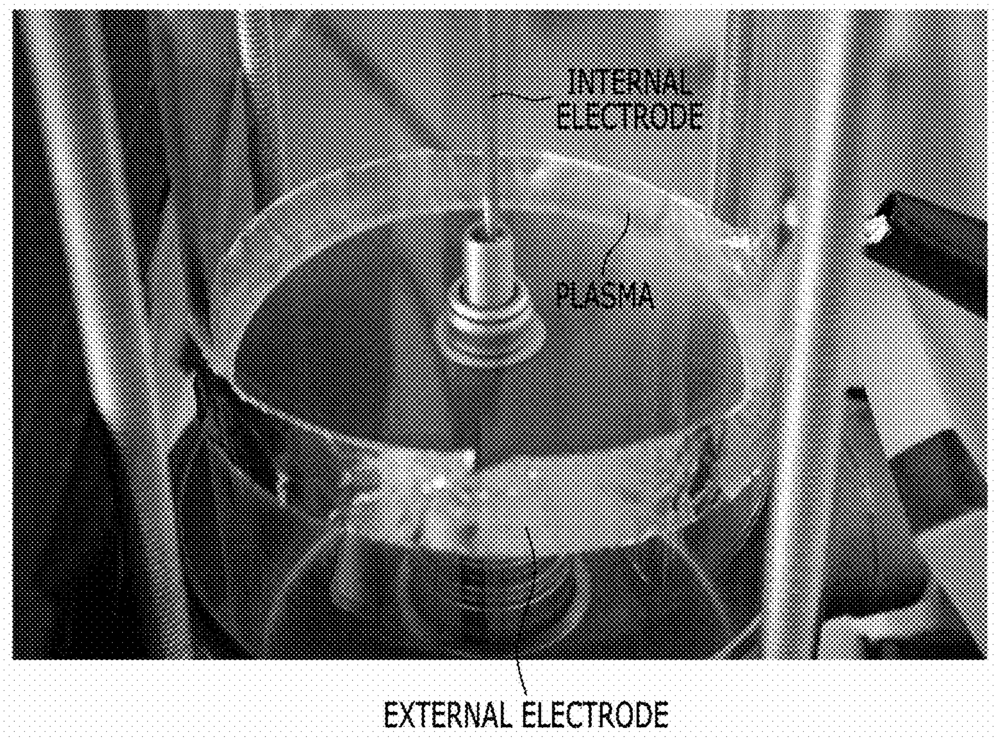
FIG. 4 is a diagram illustrating a rotating arc-type plasma generating device according to an exemplary embodiment.

In addition, in order to generate rotating arc-type plasma, internal and external electrodes having shapes as shown in FIG. 3 or 4 may be used.

FIG. 3 is a diagram illustrating a rotating arc-type plasma generating device according to an exemplary embodiment, and FIG. 4 is a diagram illustrating a rotating arc-type plasma generating device according to an exemplary embodiment.

Referring to FIG. 3, the rotating arc-type plasma generating device includes an internal electrode rotating 360 degrees by a motor and an external electrode surrounding the internal electrode in a cylindrical shape, and power is supplied to the internal electrode and the external electrode. Here, the internal electrode is a rod-shaped electrode. When a gas, such as oxygen, nitrogen, or a mixture gas of oxygen and nitrogen is injected through a gas inlet, nitrogen oxide rotating arc-type plasma is generated. The photograph on the right of FIG. 3 shows that a rotation speed of the motor is 45 Hz and the number of discharges is 90 times/see, and for example, when the internal electrode rotates once, discharge is performed twice. When the rotation speed of the motor increases, the number of discharges may increase. Accordingly, by adjusting the rotation speed of the motor, a concentration of nitrogen oxide may be more easily controlled.

Referring to FIG. 4, the rotating arc-type plasma generating device rotates 360 degrees by the motor and includes an internal electrode having a horizontal disk structure and an external electrode surrounding the internal electrode in a cylindrical shape, and power is supplied to the internal electrode and the external electrode.

In the rotating arc-type plasma generating device, the rotation speed $M_{rpm}$ of the motor may satisfy Equation 1 below.

$$0<M_{rpm}<\text{frequency } f \text{ of applied power} \quad \text{[Equation 1]}$$

Here, if the rotation speed of the motor is greater than the frequency of power applied to the plasma generating device, a discharge path may not be easily formed, and thus, a magnitude of a discharge current may be reduced, and as a result, a concentration of nitrogen oxide may significantly decrease.

A method of controlling nitrogen oxide according to an exemplary embodiment includes adjusting a flow rate of gas injected into an arc-type plasma generating device, and checking a concentration of generated nitrogen oxide, while adjusting the amount of energy per unit flow rate of the injected gas.

For example, the checking of the concentration of nitrogen oxide may include identifying that the concentration of nitrogen oxide increases and then decreases as the amount of energy per unit flow rate of gas increases.

Figure 5:
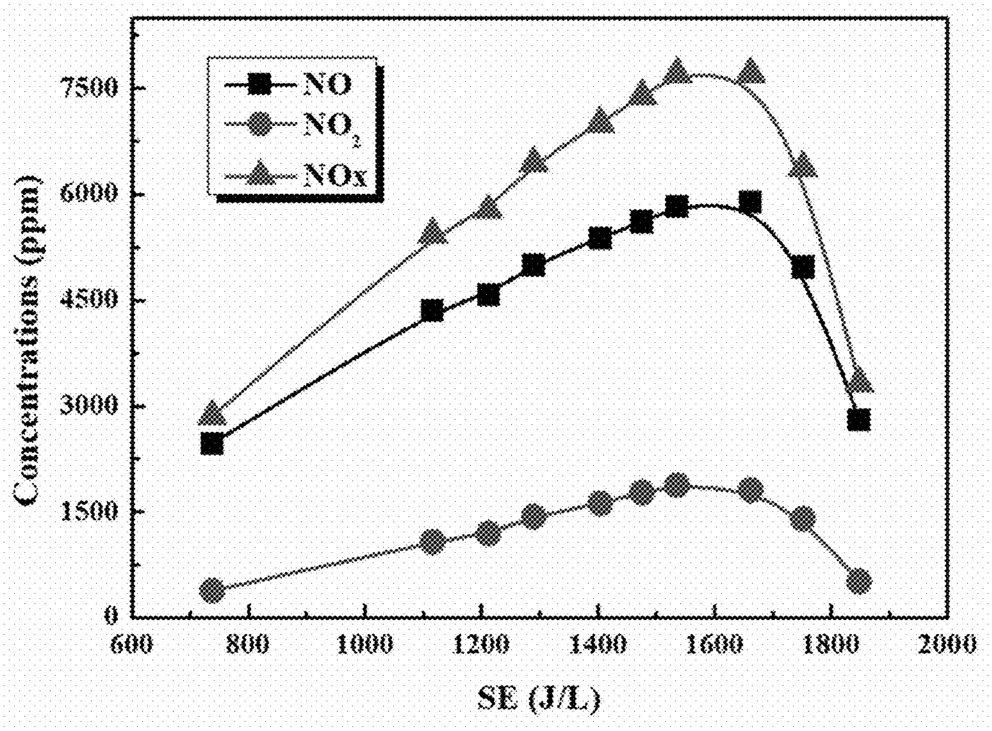
FIG. 5 is a graph illustrating a concentration of nitrogen oxide generated in the gliding arc-type plasma generating device according to FIG. 2.

FIG. 5 is a graph illustrating a concentration of nitrogen oxide generated in the gliding arc-type plasma generating device according to FIG. 2.

Referring to FIG. 5, the X-axis is specific energy (SE), which represents energy (J/L) per unit flow rate of the injected gas. For example, when the injection flow rate is 10 lpm and the applied energy is 100 W (J/s), the specific energy is 600 J/L (=100 J/s/10 L/min). It can be seen that a concentration of generated nitrogen oxide is the maximum when the SE is approximately at 1600 J/L. Accordingly, by adjusting the flow rate of the injected gas, the concentration of generated nitrogen oxide may be more easily controlled.

In addition, the checking of the concentration of nitrogen oxide may include identifying that the concentration of produced nitrogen oxide is maximized while the input voltage is minimized.

Figure 6:
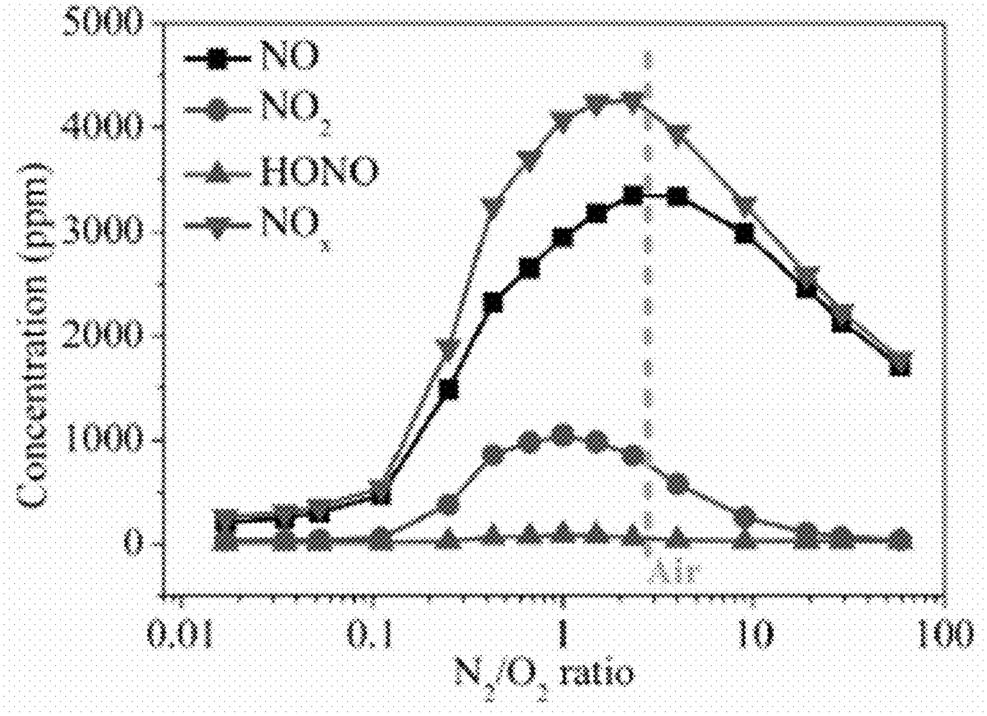
FIG. 6 is a graph illustrating a concentration of nitrogen oxide generated in the rotating arc-type plasma generating device according to FIG. 4.
Figure 7:
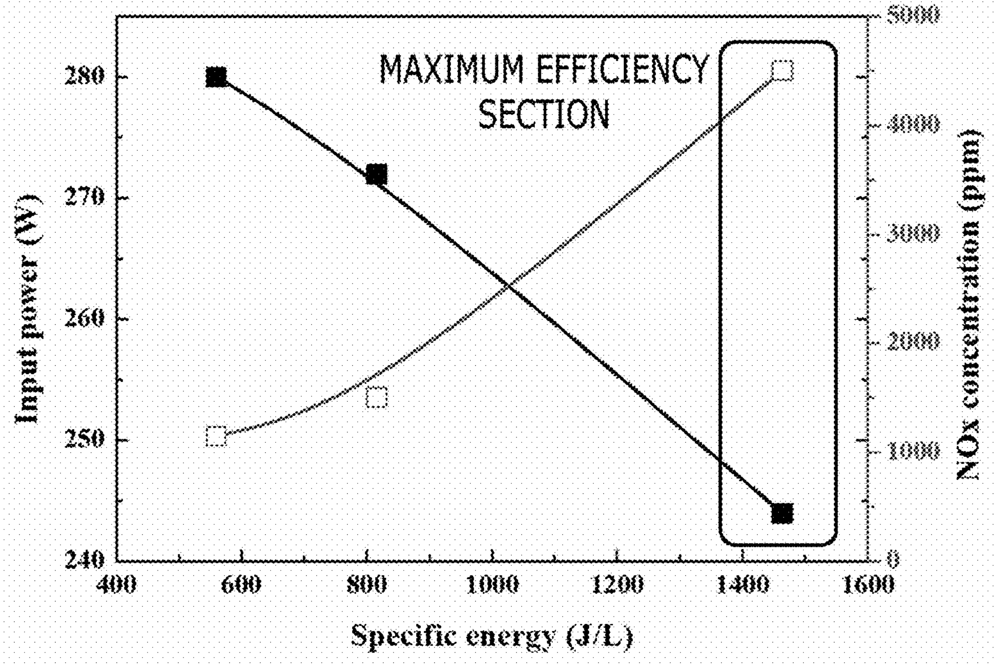
FIG. 7 is a graph illustrating an input voltage and a concentration of nitrogen oxide generated in the rotating arc-type plasma generating device according to FIG. 4.

FIG. 6 is a graph illustrating a concentration of nitrogen oxide generated in the rotating arc-type plasma generating device of FIG. 4, and FIG. 7 is a graph illustrating an input voltage and a concentration of generated nitrogen oxide in the rotating arc-type plasma generating device of FIG. 4.

Referring to FIG. 6, the X-axis represents the ratio of nitrogen to oxygen. It can be seen that the concentration of nitrogen oxide is maximized in the vicinity of a ratio of oxygen to nitrogen similar to that contained in the air. Accordingly, by adjusting the ratio of oxygen and nitrogen in the injected gas, the concentration of generated nitrogen oxide may be more easily controlled.

Referring to FIG. 7, the X-axis is specific energy (SE), which represents energy (J/L) per unit flow rate of an injected gas. It can be seen that the concentration of generated nitrogen oxide is the maximum, while the input voltage is minimized when the SE is approximately at 1400 J/L to 1500 J/L. Accordingly, by adjusting the flow rate of the injected gas, the concentration of generated nitrogen oxide may be controlled to be maximized, while the required energy is minimized.

Figure 8:
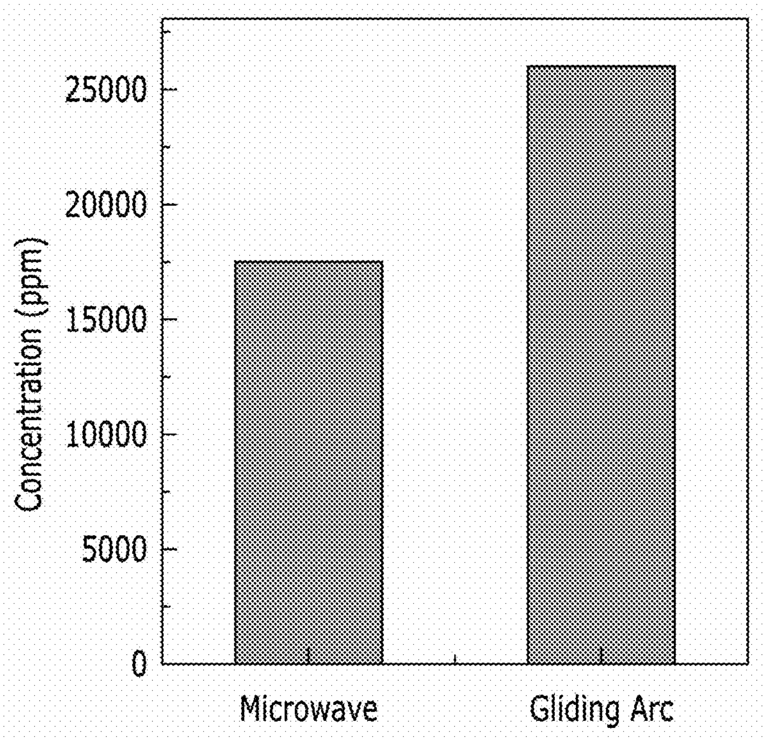
FIG. 8 is a graph illustrating a concentration of nitrogen oxide generated in the microwave plasma generating device of the related art and the gliding arc-type plasma generating device according to FIG. 2.

FIG. 8 is a graph illustrating a concentration of nitrogen oxide generated in the microwave plasma generating device of the related art and the gliding arc-type plasma generating device according to FIG. 2.

Referring to FIG. 8, when 650 W is applied, the concentration of nitrogen oxide in the microwave plasma generating device of the related art is about ppm, and the concentration of nitrogen oxide in the gliding arc-type plasma generating device according to FIG. 2 is about 26000 ppm. Therefore, in the case of the gliding arc-type plasma generating device, it can be seen that the concentration of generated nitrogen oxide for the input power is higher.

Figure 9:
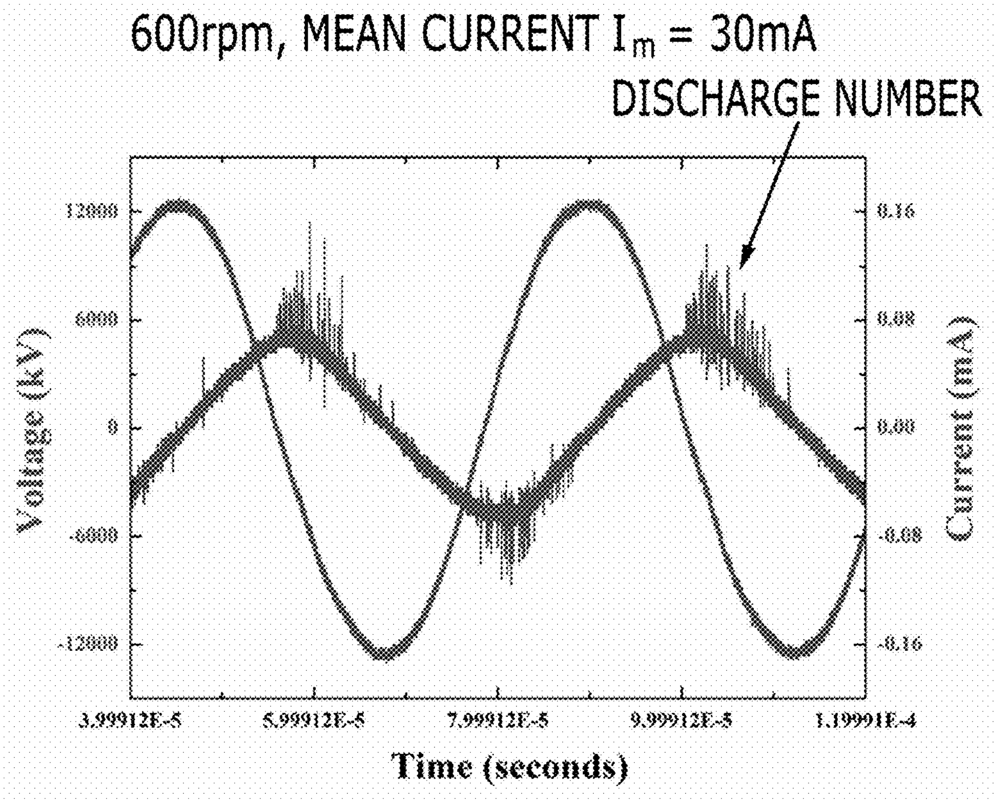
FIG. 9 is a graph illustrating discharge intensity when a rotation speed of a motor in the rotating arc-type plasma generating device according to FIG. 4 is rpm.
Figure 10:
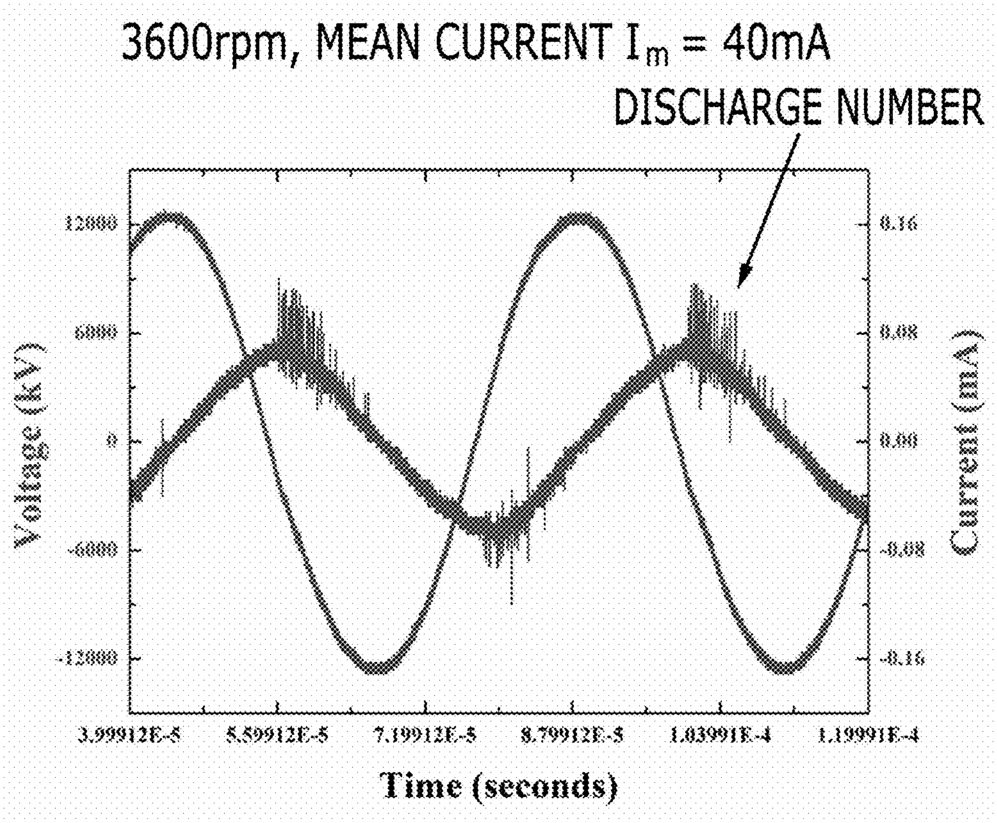
FIG. 10 is a graph illustrating discharge intensity when a rotation speed of a motor in the rotating arc-type plasma generating device according to FIG. 4 is 3600 rpm.

FIG. 9 is a graph illustrating discharge intensity when a rotation speed of a motor in the rotating arc-type plasma generating device according to FIG. 4 is rpm, and FIG. 10 is a graph illustrating discharge intensity when a rotation speed of a motor in the rotating arc-type plasma generating device according to FIG. 4 is 3600 rpm.

Referring to FIGS. 9 and 10, it can be seen that when the rotation speed of the motor is high, the rotation of the internal electrode is fast, the discharge intensity (corresponding to current) increases, and the number of discharges increases.

Hereinafter, a method for preparing nitrogen oxide using an arc-type plasma generating device according to an exemplary embodiment will be described in detail.

The method for preparing nitrogen oxide includes injecting oxygen, nitrogen, or a mixture gas thereof into an arc-type plasma generating device, rotating the injected gas, generating arc-type plasma inside the arc-type plasma generating device, and generating nitrogen oxide gas.

Hereinafter, a method for preparing NOx-containing water using an arc-type plasma generating device according to an exemplary embodiment will be described in detail.

The method for preparing NOx-containing water includes generating nitrogen oxide gas, generating nitrogen oxide water, removing oxygen which is a dissolved gas, and storing the nitrogen oxide water.

The generating of the nitrogen oxide gas includes generating nitrogen oxide by an arc-type plasma generating device according to an exemplary embodiment.

For example, the generating of the nitrogen oxide gas includes injecting oxygen, nitrogen, or a mixture gas thereof into the arc-type plasma generating device, rotating the injected gas, and generating arc-type plasma inside the arc-type plasma generating device, and generating nitrogen oxide gas.

Here, the arc-type plasma generating device generates plasma at normal pressure (atmospheric pressure). The normal pressure (atmospheric pressure) plasma has very different characteristics due to various electrode structures, driving frequencies, and conditions, and has various advantages, such as high temperature as well as low temperature processing, high density of reactive species, and a fast treatment time.

In addition, application fields of atmospheric pressure plasma are very diverse, and in particular, since it is possible to dry-treat atmospheric pressure plasma using species having strong oxidizing power or high reactivity, atmospheric pressure plasma may be used in the bio/medical field and food industry, such as food sterilization, biofilm removal, and organic film removal.

The generating of the nitrogen oxide water includes generating NOx-containing water by plasma-treating the generated nitrogen oxide gas in distilled water.

Unlike the related art in which plasma was used in wastewater treatment and a post-treatment process, such as COD and BOD reduction, decolorization, and deodorization, distilled water or solutions treated with plasma may be used in pre-treatment processes. Plasma-treated distilled water is called plasma-treated water and has good sterilizing power that may replace ozone water as sterilizing water. So-called "plasma treated water" may be produced by directly or indirectly exposing atmospheric plasma to distilled water.

Atmospheric pressure plasma is discharged with various discharge gases, such as helium, argon, nitrogen, etc., but chemical species contained in plasma treated water to be generated is determined according to the discharge gas. For example, ozone or oxygen reactive species with high sterilization power may be generated by using oxygen or a mixture gas of oxygen and other gases as a discharge gas. In addition, the chemical species dissolved in the plasma-treated water to be present change according to a waiting time. For example, synthetic nitrite, which is essential for manufacturing meat products, may be replaced with plasma-treated water. At this time, nitrite ions (Nitrite ion, $NO_2^-$) and nitrate ions (Nitrate ion, $NO_3^-$) contained in the plasma treated water are used to be important, but since the nitrite ions decrease according to the waiting time, the plasma treated water may be appropriately controlled.

[Reaction formula 1]

$$2NO(g) + O_2(g) \longrightarrow 2NO_2(g)$$

[Reaction formula 2]

$$NO + NO_2 + H_20 \longrightarrow 2NO_2- + 2H^+$$

[Reaction formula 3]

$$2NO_2 + H_2O \longrightarrow NO_2- + NO_3- + 2H^+$$

[Reaction formula 4]

$$3NO_2(g) + H_20(l) \longrightarrow 2HNO_3(aq) + NO(g)$$

[Reaction formula 5]

$$4NO_2(g) + O_2(g)H_2O(l) \longrightarrow 4HNO_3(aq)$$

[Reaction formula 6]

$$NO + OH + M \longrightarrow HNO_2 + M$$

[Reaction formula 7]

$$NO_2 + OH + M \longrightarrow HNO_3 + M$$

Nitrous acid dissolved in plasma-treated distilled water has a pK value of 3.37, and 50% thereof is dissociated in a solution of pH 3.37 to generate nitrite ions, and 99% thereof is dissociated to nitrite ions in a solution of pH 5.5 or higher (Reaction formula 8).

[Reaction formula 8]

$$HONO + H2O \longleftrightarrow H_3O^+ + NO_2^-$$

According to the stoichiometric reaction in which Reaction formulas 2 and 3 are combined, nitrous acid undergoes intermediate chemical reactions, and finally, disproportionation occurs in which nitric oxide, nitrate ions, hydrogen ions, and water are produced. That is, nitrous acid is decomposed over time and reduced in concentration, and a decomposition rate thereof is determined by a temperature of the solution and an initial concentration of nitrous acid. As the initial concentration of nitrous acid and the temperature of the solution are higher, the decomposition rate increases. Accordingly, as the waiting time of the treated water passes, nitrous acid decreases and nitrate ions increase at the same time, which is caused by the disproportionation of nitrous acid, the reaction formula is as follows.

$$3HNO_2 \longrightarrow 2NO + NO_3^- + H^+ + H_2O$$

In the removing of oxygen, which is a dissolved gas, oxygen is removed from the prepared NOx-containing water. For example, the removal of dissolved oxygen may be performed by a vacuum method, a nitrogen blowing method, or both. The vacuum method is a method of depressurizing air using a vacuum pump. The nitrogen blowing method is a method of removing oxygen from water by blowing nitrogen in a gas phase.

The concentration of each chemical species changes according to a storage period. For example, in the prepared NOx-containing water, the concentration of NO, including nitrite ions, decreases, while nitrate ions increase. The sum of nitrous acid and nitrite ions according to the oxygen concentration present in the prepared NOx-containing water decreases with the storage period. For example, as the concentration of dissolved oxygen is higher, the rate of reduction of nitrous acid and nitrite ions increases over the storage period. When the concentration of dissolved oxygen in NOx-containing water is reduced and stored, a reduction of nitric oxide due to dissolved oxygen may be prevented, thereby reducing a reduction rate of nitrite ions. In the case of using low-temperature plasma (DBD, corona, etc.), dissolved ozone should also be removed.

The storing of the nitrogen oxide water includes cooling and storing the NOx-containing water.

A cooling temperature may be between −80 degrees Celsius and 20 degrees Celsius, and preferably, the nitrogen oxide water is cooled at a temperature between −80 degrees Celsius and 0 degrees Celsius. Since the decomposition rate of nitrous acid is proportional to the temperature, the decomposition rate of nitrous acid and nitrite ions may be reduced when the nitrogen oxide water is stored at a lower temperature.

In the NOx-containing water, nitrite ions and nitrous acid exist in a specific ratio depending on the pH of the solution, and therefore, it is necessary to increase pH (4.5 to 13). Nitrous acid is finally decomposed into nitric oxide, nitrate ions, hydrogen ions, and water by a disproportionation, and therefore, it is necessary to increase pH (4.5 to 13). The decomposition rate is determined by an initial concentration of nitrous acid, a storage temperature of the solution, and a concentration of dissolved oxygen and dissolved ozone, and accordingly, it is necessary to remove dissolved oxygen species.

The exemplary embodiments of the present invention have been described in detail, but the scope of the present invention is not limited thereto and various variants and modifications by a person skilled in the art using a basic concept of the present invention defined in claims also belong to the scope of the present invention.

The invention claimed is:

1. A method for controlling nitrogen oxide (NOx), the method comprising:

adjusting a flow rate of a gas injected into an arc-type plasma generating device, identifying a concentration of generated nitrogen oxide, while adjusting an amount of energy per unit flow rate of the injected gas, and controlling the concentration of the generated nitrogen oxide by adjusting the flow rate of the injected gas, wherein the arc-type plasma generating device includes an internal electrode and an external electrode facing the internal electrode, supplies oxygen, nitrogen, or a mixture gas thereof injected between the internal electrode and the external electrode, and applies voltage to the internal electrode and the external electrode to generate an arc-type plasma including nitrogen oxide, and the internal electrode is rod-shaped, the external electrode surrounds the internal electrode, and a gap between the internal electrode and the external electrode is gradually away from each other in a longitudinal direction of the internal electrode, and a gliding arc occurs between the gap, and wherein the identifying of the concentration of the generated nitrogen oxide includes identifying that the concentration of the generated nitrogen oxide increases and then decreases as the amount of energy per unit flow rate of the injected gas increases.

2. The method of claim 1, wherein:

the identifying of the concentration of nitrogen oxide includes identifying that the concentration of the generated nitrogen oxide is maximum, while the input voltage is minimized.

* * * * *